United States Patent [19]

Kohl

[11] 4,198,380

[45] Apr. 15, 1980

[54] ABSORPTION OF SULFUR OXIDES FROM HOT GASES

[75] Inventor: Arthur L. Kohl, Woodland Hills, Calif.

[73] Assignee: Rockwell International Corporation, El Segundo, Calif.

[21] Appl. No.: 634,726

[22] Filed: Nov. 24, 1975

[51] Int. Cl.$^2$ .............................................. C01B 17/00
[52] U.S. Cl. ..................................................... 423/242
[58] Field of Search ................................. 423/242–244

[56] References Cited

U.S. PATENT DOCUMENTS

| | | | |
|---|---|---|---|
| 1,271,899 | 7/1918 | Howard | 423/242 |
| 3,533,748 | 10/1970 | Finfer et al. | 423/512 X |
| 3,929,968 | 12/1975 | Taub | 423/242 |
| 3,969,482 | 7/1976 | Teller | 423/242 |

OTHER PUBLICATIONS

SO$_2$ Removal Without Sludge, Rockwell International Publication, 1974.

Primary Examiner—O. R. Vertiz
Assistant Examiner—Gregory A. Heller
Attorney, Agent, or Firm—L. Lee Humphries; Henry Kolin; Clark E. DeLarvin

[57] ABSTRACT

A process for removing sulfur oxides from a hot gas by sequential absorption of the sulfur oxides in two zones. In each zone the hot gas is contacted with an aqueous scrubbing medium which may be a solution or slurry containing an absorbent for the sulfur oxides. The absorbent is selected from the group consisting of alkali metal carbonates, bicarbonates and mixtures thereof. The preferred absorbent is sodium carbonate. The aqueous solution is introduced into the first zone in an amount to produce (1) a dry powder reaction product containing alkali metal sulfites, and sulfates, substantially free of unreacted absorbent and (2) a substantially water-unsaturated gaseous reaction product of reduced sulfur oxide content. The gaseous reaction product of reduced sulfur oxide content is transferred into the second zone where it is contacted with a sufficient amount of an aqueous solution of absorbent to provide (1) a gaseous reaction product substantially free of sulfur oxide and (2) an aqueous solution containing alkali metal sulfites, sulfates and unreacted absorbent, which solution is used as at least a part of the aqueous solution fed into the first zone.

10 Claims, 2 Drawing Figures

ABSORPTION OF SULFUR OXIDES FROM HOT GASES

BACKGROUND OF THE INVENTION

1. Field of the Invention

The present invention relates to a process for the removal of sulfur compounds from hot gases containing the same. It particularly relates to a process wherein a hot gas containing sulfur oxides is passed sequentially through two zones and contacted in each zone with an aqueous scrubbing medium containing a sulfur oxide absorbent.

2. Prior Art

Sulfur oxides, principally present as sulfur dioxide, are present in the waste gases discharged from many metal refining and chemical plants and in the flue gases from power plants generating electricity by the combustion of fossil fuels. In addition, hot sulfur containing gases may be formed in the partial combustion or gasification of sulfur containing fuels, such as coal. The control of air pollution resulting from the discharge of sulfur oxides into the atmosphere has become increasingly urgent. An additional incentive for the removal of sulfur oxides from waste gases is the recovery of sulfur values otherwise lost by discharge to the atmosphere. However, particularly with respect to the flue gases from power plants, which based on the combustion of an average coal many contain as much as 3000 p.p.m. sulfur dioxide and 30 p.p.m. sulfur trioxide by volume, the large volumes of these flue gases relative to the quantity of sulfur which they contain make removal or recovery of the sulfur compounds expensive. Also, while the possible by-products, such as elemental sulfur and sulfuric acid, that may be ultimately obtained from the recoverable sulfur values have virtually unlimited markets as basic raw materials, they sell for relatively low figures. Consequently, low-cost recovery processes are required.

Many processes have been proposed and investigated for the desulfurization of flue gases. Several dry processes have been proposed in which sulfur dioxide is removed either by chemical reaction with a solid absorbent or by adsorption on its surface followed by oxidation of the adsorbed sulfur dioxide. In one such process, shown in U.S. Pat. No. 2,718,453, finely powdered calcium carbonate is blown into the combustion gas to form calcium sulfate or calcium sulfite. In general, a reaction between a solid and gas is relatively slow and inefficient, being limited by the available surface area of the solid. Also certain of the resultant products do not readily lend themselves to regeneration of the starting material or recovery of the removed sulfur values.

In the molten carbonate process shown in U.S. Pat. Nos. 3,438,722; 3,438,727; and 3,438,728, sulfur oxide impurities are removed from a hot combustion gas by contacting it at a temperature of at least 350° C. with a molten salt mixture containing alkali metal carbonates as the active absorbent. The spent absorbent is then regenerated chemically and recirculated. The adaptation of such a process to many older existing powerplant utility installations often presents certain economic disadvantages because of the requirements for modifying the boiler systems of these utility plants in order to obtain the flue gas to be treated at the required elevated temperature for the molten salt absorption rather than at its generally much lower exit temperature from the boiler.

Wet absorption processes are suitable for treating lower temperature flue gases. In a typical wet absorption process, the flue gas is washed with an aqueous alkaline solution or slurry. Thus the use of an aqueous slurry of calcium hydroxide or calcium carbonate has been investigated in several British power plants. Also, aqueous sodium sulfite or ammonia solutions have been utilized as washing fluids.

In the wet absorption process shown in U.S. Pat. No. 3,533,748, a waste gas stream containing sulfur oxides is scrubbed with an aqueous solution of a soluble alkali such as sodium carbonate or sodium hydroxide to form sulfite and sulfate in solution. The resulting solution is then evaporated to precipitate solid alkali metal sulfite and sulfate salts, which are separated from the solution and further processed.

While these wet absorption processes have some advantages, they suffer from a common drawback of producing a liquid effluent containing a large amount of water relative to the sulfur oxide absorbed, which effluent is not amenable to simple high temperature reduction and regeneration. Thus, difficulties arise where economic and efficient recovery of the dissolved absorbent and sulfur values from an aqueous solution is attempted. In many such processes, the recovery of elemental sulfur, a preferred product, is not economical.

In U.S. Pat. No. 3,305,307 there is shown a process for the manufacture of solid alkali metal sulfite with negligible formation of alkali metal sulfate. A finely dispersed concentrated aqueous solution of an alkali metal compound such as sodium or potassium carbonate, hydroxide, or bicarbonate is passed into a substantially dry gas containing an equivalent or greater amount of sulfur dioxide, the dry gas being maintained at a temperature such that solid alkali metal sulfite is formed. To obtain a pure alkali metal sulfite by such a process, an excess reactant amount of $SO_2$ compared with the alkali metal compound is required. Also, to avoid the formation of alkali metal sulfate, the gas containing the $SO_2$ reactant must be relatively free of sulfur trioxide and oxidation-promoting substances such as nitrogen oxides and metal oxides, the latter being found in the fly ash. In addition, a relatively low temperature of reaction is generally required, higher temperatures promoting formation of sulfate. A principal disadvantage of this type of process is that a significant amount of particulates (reacted and partially reacted absorbent) are carried out by the gas, necessitating a subsequent filtration operation.

More recently, in application Ser. No. 300,925 filed Oct. 26, 1972 now U.S. Pat. No. 3,932,587, and assigned to the assignee of the present invention, there is disclosed a closed-cycle process for removing in a single spray drying step a sulfur oxide impurity from a hot waste gas. In accordance with the process disclosed therein a hot sulfur oxide-containing waste gas at a temperature of at least 90° C. is contacted with an aqueous scrubbing medium containing between 2 and 40 wt.% of an absorbent selected from the group consisting of alkali metal carbonates, bicarbonates and mixtures thereof. The absorbent is introduced in a sufficient quantity to provide a resultant reaction product comprising a flowable, dry powder mixture containing from 20 to 85 wt.% alkali metal sulfite and sulfate and from 15 to 80 wt.% of the absorbent. The dry powder product is reacted in a molten state with a carbonaceous reducing agent under reducing conditions, to convert the sulfite and sulfate to sulfide. The molten reaction product of alkali metal sulfide and carbonate is recovered and dissolved in water to form an aqueous solution. The aqueous solution then is reacted with a carbon dioxide yielding material to form hydrogen sulfide gas as a recoverable product and regenerate alkali metal bicarbonate and carbonate for recirculation in the process.

SUMMARY OF THE INVENTION

The present invention provides a novel process for removing sulfur oxides from hot gases, which process avoids the disadvantages heretofore characterizing absorption processes. More particularly, in accordance with the present invention it is possible to obtain substantially complete absorbent utilization while concurrently removing in excess of 90% of the sulfur oxides contained in the hot gas. Further, in accordance with the present invention the reacted absorbent is recoverable as a dry powder product substantially free of unreacted absorbent.

Broadly the process comprises passing the hot gas sequentially through two zones in each of which it is contacted with an aqueous scrubbing medium containing an absorbent. At least a part of the aqueous scrubbing medium introduced into the first zone is obtained from the second zone. More particularly, the hot gas containing sulfur oxides is introduced into the first zone where it is contacted with a finely dispersed aqueous scrubbing medium containing an absorbent selected from the group consisting of alkali metal carbonates, bicarbonates and mixtures thereof to form (1) a substantially water-unsaturated gaseous reaction product of reduced sulfur oxide content and (2) a dry powder reaction product containing alkali metal sulfites and sulfates, substantially free of unreacted absorbent.

The gaseous reaction products from the first zone then are transferred into the second zone. In the second zone the gas is contacted with another aqueous scrubbing medium containing an absorbent selected from the same group to form (1) an aqueous solution of alkali metal sulfites, sulfates and unreacted absorbent and (2) a gaseous reaction product substantially free of sulfur oxides. A portion of the aqueous solution formed in the second zone is removed and used as at least a part of the aqueous scrubbing medium introduced into the first zone. Advantageously another portion of the aqueous solution formed in the second zone is recycled therethrough for further reaction with the hot gases passing through the second zone.

It is an essential feature of the present invention that the aqueous scrubbing medium introduced into the first zone contain less than about the stoichiometric amount of absorbent required to react with all of the sulfur oxides contained in the hot gas passing therethrough. In the second zone, however, a sufficient amount of aqueous scrubbing medium is introduced to provide a stoichiometric excess of absorbent required to react with all the sulfur oxides contained in the gas passing through the second zone.

For obvious economic reasons the dry powder product from the first zone preferably is recovered and treated to regenerate additional absorbent and recover the commercial sulfur values contained therein. The dry powder product may be treated at elevated temperatures with a reducing agent, preferably a carbonaceous material, to reduce the sulfite and sulfate to sulfide. Concurrently, a source of oxygen may be provided to generate sufficient heat for the reduction by a combustion reaction with the carbonaceous material. In a subsequent aqueous reformation step the sulfide is dissolved in water and reacted with carbon dioxide or a carbon dioxide-yielding material to form hydrogen sulfide as a recoverable product for further processing and to regenerate the carbonate absorbent.

With respect to the proposed reduction and reformation steps herein, the reduction of sodium sulfate with carbon is generally known, particularly in connection with pulping operations; illustrative are U.S. Pat. Nos. 1,130,317; 1,609,615; and 3,248,169. Gasification and combustion of carbonaceous materials are shown in U.S. Pat. Nos. 3,533,739 and 3,567,412. U.S. Pat. Nos. 2,344,104 and 2,838,374 also deal with the reduction of sulfites and sulfates. The aqueous reformation step has been generally shown in the art in connection with neutral sulfite semichemical pulping and Kraft processes. Illustrative are U.S. Pat. Nos. 2,163,554, and 2,611,682.

DETAILED DESCRIPTION OF THE INVENTION

Figure 1:
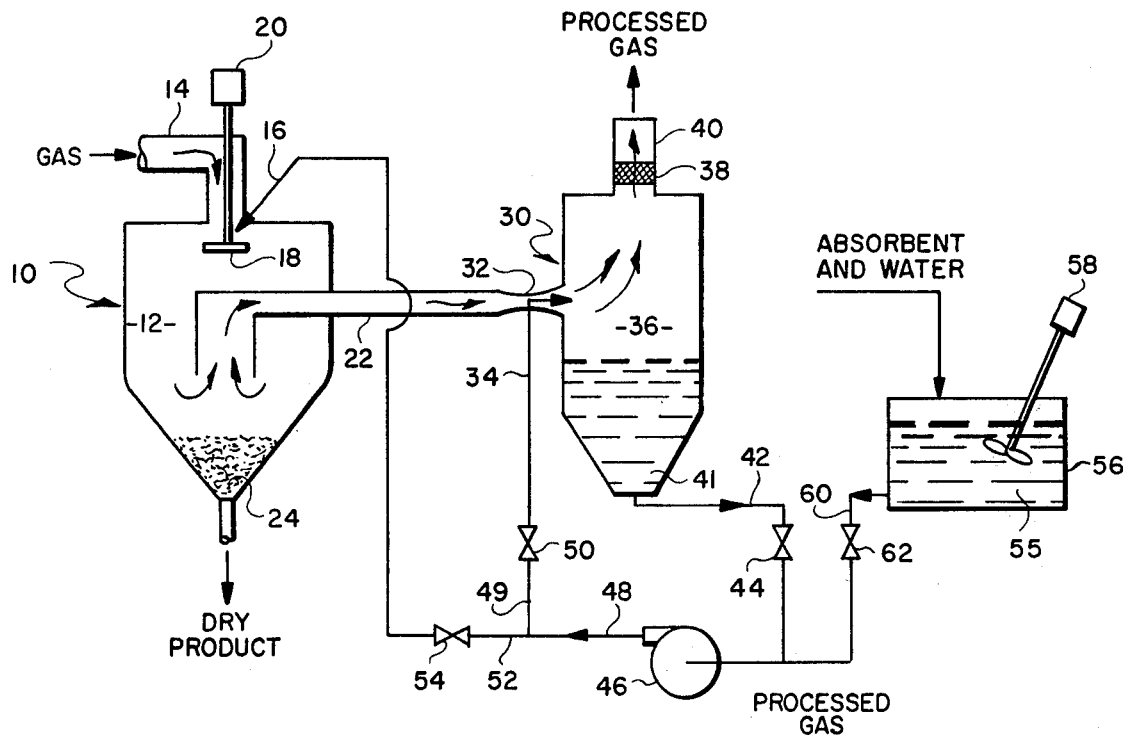
FIG. 1 is a schematic flow diagram illustrating one embodiment of the process of the present invention.

The present process is applicable to any hot gas containing sulfur oxides which can be effectively contacted with an aqueous scrubbing medium containing an absorbent for the sulfur oxides. The process is particularly applicable to flue gas obtained from the burning of fossil fuels such as for example, petroleum, petroleum products, coal, coal tars, coke and the like. The process is suitable for use with hot sulfur oxide containing gases having a minimum temperature of about 90° C. up to a temperature 800° C. or higher. The flue gas from the boilers of older power plant utility installations is generally within a range from about 150° to 230° C. (which may contain sulfur dioxide in amounts up to about 5000 p.p.m.) and thus, is readily processable in accordance with the present invention. Alternatively, waste gases at a temperature higher than 230° C., such as the waste gases from various chemical processing plants (which may contain sulfur dioxide in amounts of from about 1 to 10% by volume), also are readily processable in accordance with the present invention.

For convenience, the present invention will be discussed with reference to the removal of sulfur oxides from a flue gas produced by the burning of coal. Such flue gas may contain fly ash in amounts up to about 10 wt.% of the flue gas. In accordance with the present process, it is not necessary to remove the fly ash prior to treatment for removal of the sulfur oxides since the ash is removed by the process. However, where it is desired to process the reacted absorbent for the recovery of sulfur values and regeneration of the absorbent, it generally is preferred that at least 90% and preferably about 99% of the ash be removed from the flue gas prior to its initial contact with the aqueous absorbent.

In accordance with the present process, a sulfur oxide containing flue gas is transferred through two zones in each of which zones it is contacted with an aqueous scrubbing medium containing an absorbent for the sulfur oxide. The preferred absorbents are alkali metal carbonates, bicarbonates, and mixtures thereof. Sodium or potassium carbonates, bicarbonates, or mixtures thereof, generally are preferred based on their lower costs and availability. Potassium carbonates and bicarbonates have a higher solubility in the aqueous solution; however, sodium is substantially cheaper and therefore generally is selected as the absorbent.

For effective removal of sulfur oxides, it is essential that the aqueous scrubbing medium intimately contact the gaseous stream. In the first zone the aqueous scrubbing medium is evaporated to form a dry powder product and it is necessary, therefore, that it be introduced as a finely dispersed spray. In the second zone intimate contact between the scrubbing medium and the gas may be obtained utilizing any of a number of techniques and apparatus known to those versed in the art. For example, the aqueous scrubbing medium may be introduced through a plurality of spray nozzles, by cascading the aqueous scrubbing medium through a plurality of perforated trays or by impinging a stream of the aqueous scrubbing medium upon a rotating disc. In addition intimate contact between the gas and aqueous scrubbing medium may be obtained through the use of a venturi scrubber, a packed tower, bubble cap columns and the like.

While the exact mechanism by which the sulfur oxides are absorbed is not fully known, the principal chemical reactions that occur may be represented in exemplary form as follows:

$$Na_2CO_3 + SO_2 \rightarrow Na_2SO_3 + CO_2$$

$$Na_2CO_3 + SO_3 \rightarrow Na_2SO_4 + CO_2$$

$$2NaHCO_3 + SO_2 \rightarrow Na_2SO_3 + H_2O + 2CO_2$$

$$2NaHCO_3 + SO_3 \rightarrow Na_2SO_4 + H_2O + 2CO_2$$

$$2Na_2SO_3 + O_2 \rightarrow 2Na_2SO_4$$

From the foregoing it is seen that one mole of sodium carbonate will absorb one mole of an oxide of sulfur, whereas two moles of sodium bicarbonate are required to absorb an equivalent amount of an oxide of sulfur.

In the first zone, the sulfur oxide containing gas and aqueous scrubbing medium are contacted in a manner to obtain the expended absorbent as a dry powder reaction product and further, to obtain complete utilization of substantially all the absorbent contained in the aqueous scrubbing medium. It is an essential feature of the present invention, therefore, that the aqueous scrubbing medium be introduced at a rate to provide an amount of water less than that which would cool the gas to its adiabatic saturation temperature. Preferably, the aqueous scrubbing medium is introduced at a rate to provide a product gas which is water unsaturated, namely, a product gas having a relative humidity of less than about 75% and preferably less than about 50% at the temperature at which it leaves the first zone. It also is an essential feature of the present invention that the aqueous scrubbing medium entering the first zone contain less than about one equivalent weight of absorbent per equivalent weight of $SO_2$ contained in the hot gas to be processed. More particularly, by maintaining such ratio or lower ratios of absorbent to $SO_2$, it is possible to obtain substantially complete utilization of all the absorbent introduced into the first zone. Generally, the equivalent weight ratio of absorbent to sulfur oxide is from about 0.6:1 to 1:1 and preferably about 0.8:1.

The hot gas processed in the first zone then is transferred into the second zone where it is again contacted with an aqueous scrubbing medium. In the second zone, however, the aqueous scrubbing medium is introduced at a rate to provide a stochiometric excess of absorbent. More particularly, the scrubbing medium is introduced at a rate sufficient to provide at least about 1.5 equivalents and preferably from 2 to 10 equivalents of absorbent per equivalent of $SO_2$ contained in the gas entering the second zone.

In order to avoid evaporation of the scrubbing medium to dryness in the second zone it is essential that the aqueous scrubbing medium be introduced at a rate sufficient to supply an amount of water in excess of that required to cool the gate to its adiabatic saturation temperature, whereby there is formed in the second zone an aqueous solution of reacted absorbent, partially reacted absorbent, and unreacted absorbent. It further is an essential feature of the present invention that the aqueous solution formed in the second zone comprises at least a part of the aqueous scrubbing medium introduced into the first zone.

The advantages obtained in accordance with the present process include (1) the ability to remove in excess of 90% of the $SO_2$ from a hot gas containing the same, (2) substantially complete utilization of all the absorbent, and (3) substantially all of the expended absorbent (solid reaction product) is recovered as a dry powder product.

Thus in accordance with the present invention, if the expended absorbent is disposed of as waste, no valuable carbonate or bicarbonate absorbent is contained therein and lost from the system. Further, if it is desired to transport the spent absorbent to another facility for regeneration and recovery of the sulfur values, no additional expense is incurred transporting either water or any substantial amount of unreacted absorbent. These and many other benefits will be apparent to those versed in the art.

The dry powder product (spent absorbent) from the first zone is readily regenerable using any of a number of known methods. An exemplary method is disclosed in assignee's pending application, Ser. No. 300,925 filed Oct. 26, 1972. Broadly, the regeneration method disclosed therein comprises two steps, viz., reduction and reformation. The following description relates to that method.

Reduction

The dry powder product is introduced into a reducer comprising an oxidation zone and a reduction zone. The product is first introduced into the combustion or oxidation zone of the two-zone reducer. A controlled amount of an oxygen-containing gas, e.g., air, is injected into the oxidation zone to generate sufficient heat to maintain the salt in a molten state. By controlling the amount of oxygen added to the oxidation zone, the oxidation reaction can be controlled so as to provide only sufficient heat to sustain a reduction reaction in the molten state. In order to control the reaction occurring in the oxidation zone as well as to form a certain amount of sodium sulfide in this zone, it is preferred to admix carbon with the dry powder product, prior to its injection into the zone. Sodium carbonate may also be mixed with the product to lower its melting point.

The following intermediate reaction is believed to occur in the oxidation zone of the reducer:

$$Na_2S + 2O_2 \rightarrow Na_2SO_4$$

This reaction is a highly exothermic one and provides in situ heat generation.

The carbonate-sulfite-sulfate-sulfide melt flows from the oxidation zone to the reduction zone of the reducer where a carbonaceous material converts the sodium sulfate and any remaining sodium sulfite to sulfide. The molten sodium carbonate-sodium sulfide is recirculated internally to the oxidation zone where sufficient heat is being generated in situ for effecting the reduction reaction in the reduction zone.

The following over-all exemplary reduction reactions occur in the reducer, principally in the reduction zone:

$$Na_2SO_4 + 2C \rightarrow Na_2S + 2CO_2$$

$$Na_2SO_3 + 3/2C \rightarrow Na_2S + 3/2CO_2$$

Both of these reactions are highly endothermic and require a supply of heat for their maintenance. By performing these reactions in a molten salt state, reactivity is substantially enhanced for both the reduction of sulfate as well as any sulfite present to form sulfide. The presence of sodium carbonate in the melt lowers the melting point of the mixture so that the mixture may be maintained in the liquid phase at feasible temperatures. Since the dry product of the present invention is substantially free of unreacted absorbent (sodium carbonate), a controlled amount may be added, preferably about 15 wt.%. The reduction reaction is performed at a temperature between 750° and 1100° C., preferably between 850° and 950° C. Residence times between 5 minutes and one hour are suitable for effecting reduction.

Since sodium sulfite can be oxidized to sodium sulfate, and since it is also known to disproportionate to sulfate and sulfide at temperatures above 500° C. according to the following equation:

$$4Na_2SO_3 \rightarrow Na_2S + 3Na_2SO_4,$$

ordinarily the principal species undergoing reduction in the reducer is sulfate.

Essentially any carbonaceous material providing a source of active carbon may be added to the reduction zone. Also, other reducing materials not ordinarily considered as a source of active carbon such as natural gas, methane, and carbon monoxide may be utilized. In general the material utilized in the reducer to reduce the sulfate and sulfite will include reducing agents that have low ash contents and that are relatively inexpensive. Such reductants include coke, asphalts, tars, pitches, hydrogen, natural gas, methane, carbon monoxide, petroleum residues, residual fuel oils and the like. The use of fluidized petroleum coke is preferable. Many of these substances ordinarily are heavily contaminated with sulfur-containing materials and are of little or no economic utility. In the present process such materials may be ideally utilized in the reducer, the sulfur contaminants present actually constituting an asset with respect to later sulfur recovery.

Oxygen may be added in any form which is reactive with the sulfide to form the sulfate. In general air is a preferred form of oxygen for economic reasons.

In addition to feeding oxygen and the carbonaceous material to the reducer, it may be further desirable to include a catalyst to promote the reduction reaction. Iron has been found to be such a catalyst. Thus an amount of iron ranging from about 0.5 to about 7 wt.% of the melt may be used. The iron may be added in an elemental form or in the form of compounds containing iron such as, for example, iron sulfide or iron sulfate.

Where a carbonaceous material providing reactive carbon is used as the reductant, it is preferably added in solid or liquid form. Depending in part upon the particular reductant selected, the reaction parameters (including relative proportions of feedstock and reductant material, temperature, pressure and, solid-liquid, liquid-liquid, or gas-liquid contact conditions) are selected so as to favor the principal reduction reactions and minimize the effects of competing side reactions. However, reaction conditions are selected to optimize the formation of sulfide while at the same time obtaining maximum advantage of the exothermic sulfate formation reaction. Also, since it is desired to remove sulfide and not sulfate from the reducer, the addition of the oxygen source is carefully controlled, and excess carbon is utilized. It is preferred to use about 1.5 times the stoichiometrically required amount of carbon to effect complete reduction. The excess carbon indirectly provides the required amount of heat.

Carbon dioxide is evolved from the reduction zone of the reducer and may be recovered for subsequent use in the reformation step. Since air is principally used as the source of oxygen fed to the oxidation zone, the hot nitrogen-rich gas evolved from the reduction zone may be recovered and admixed with the scrubbed flue gas, whereby the heat content of the nitrogen gas is utilized for maintaining high flue gas temperatures.

Reformation

An aqueous process is utilized for the reformation step of the two-stage regeneration. A portion of the molten sodium carbonate-sodium sulfide mixture is drained from the reducer and gravity-fed to a dissolver tank. There the melt is contacted with water to form a highly concentrated, essentially saturated aqueous solution of sodium carbonate-sodium sulfide. The hot aqueous solution is removed from the dissolver tank and fed to a filter for removal of any residual fly ash or unreacted carbonaceous material. The fly ash-free aqueous saturated solution is then transferred from the filter to a reformer unit.

$CO_2$ gas also is fed to the reformer unit. The overall reaction in the reformer unit is represented by the following exemplary reaction:

$$Na_2S + H_2O + CO_2 \rightarrow Na_2CO_3 + H_2S$$

The hydrogen sulfide gas formed is discharged from the system to a hydrogen sulfide storage tank. The sulfur values may be readily recovered from the hydrogen sulfide as elemental sulfur in a conventional Claus plant or as $H_2SO_4$. The bottoms from the reformer unit consisting principally of a sodium carbonate-sodium bicarbonate slurry are removed and filtered. The filter cake is slurried with water or with a portion of the filtrate from the filter and is suitable for reuse in the process.

An alternative method of aqueous reformation for converting the sodium sulfide to sodium carbonate and hydrogen sulfide involves utilization of $NaHCO_3$ as a carbon dioxide-yielding material. The over-all aqueous reaction may be represented as follows:

$$Na_2S + 2NaHCO_3 \rightarrow 2Na_2CO_3 + H_2S$$

Referring now to the drawings and FIG. 1 in particular, thereon is depicted a schematic flow diagram illustrating a preferred mode of practicing the process of the present invention. The hot sulfur oxide containing gas enters the first scrubber 10 via conduit 14. An aqueous scrubbing medium enters scrubber 10 through line 16 where it impinges upon a rotating disc 18 driven by motor 20. The rotating disc 18 forms a finely dispersed spray of the aqueous scrubbing medium for more effective contact with the sulfur oxide containing gas in the first zone 12. The sensible heat of the flue gas evaporates the aqueous scrubbing medium forming (a) a dry reaction product 24 consisting essentially of sulfites and sulfates, and (b) a partially water saturated product gas of reduced sulfur oxide content.

The product gas is transformed from zone 12 via conduit 22 to a second scrubber 30, which for convenience is depicted as a venturi scrubber. The gas passes through a venturi section 32 where it is contacted with a scrubbing medium introduced via line 34 forming an intimate mixture. The mixture of gas and scrubbing medium enter zone 36 where the hot gas now substantially free of sulfur oxides passes out of scrubber 30 through outlet 40, which preferably is provided with a demister means 38 such as for example, a filter mat or fixed blade demister.

The aqueous scrubbing medium separates from the gas and collects in the bottom of scrubber 30, forming an aqueous solution 41 of sulfites, bisulfites, sulfates, and unreacted and partially reacted absorbent. The aqueous solution formed in scrubber 30 is removed through line 42, valve 44 and pump 46. A major portion of the solution discharged from pump 46 through line 48 is recycled through scrubber 30, via line 49 and valve 50. Another portion of the solution discharged from pump 46 is used as the source of scrubbing medium introduced into scrubber 10 via line 52, valve 54 and line 16.

Additional makeup absorbent and water are supplied from container 56 which preferably is provided with a stirring means such as a motor driven paddle 58. The aqueous scrubbing medium 55 is withdrawn from container 56 and added to the process via line 60 and valve 62. Since substantially complete utilization of the absorbent is obtained in the present process and in excess of 90% of the $SO_2$ is absorbed, the absorbent need be added to the process only in about that stochiometric amount required to react with all of the $SO_2$ contained in the untreated hot gas entering scrubber 10, namely, about 1 equivalent weight of absorbent per equivalent weight of $SO_2$, for example 1 mole sodium carbonate per mole of $SO_2$. Makeup water is added in an amount of about that required to cool the hot gas entering absorber 10 to its adiabatic saturation temperature.

Figure 2:
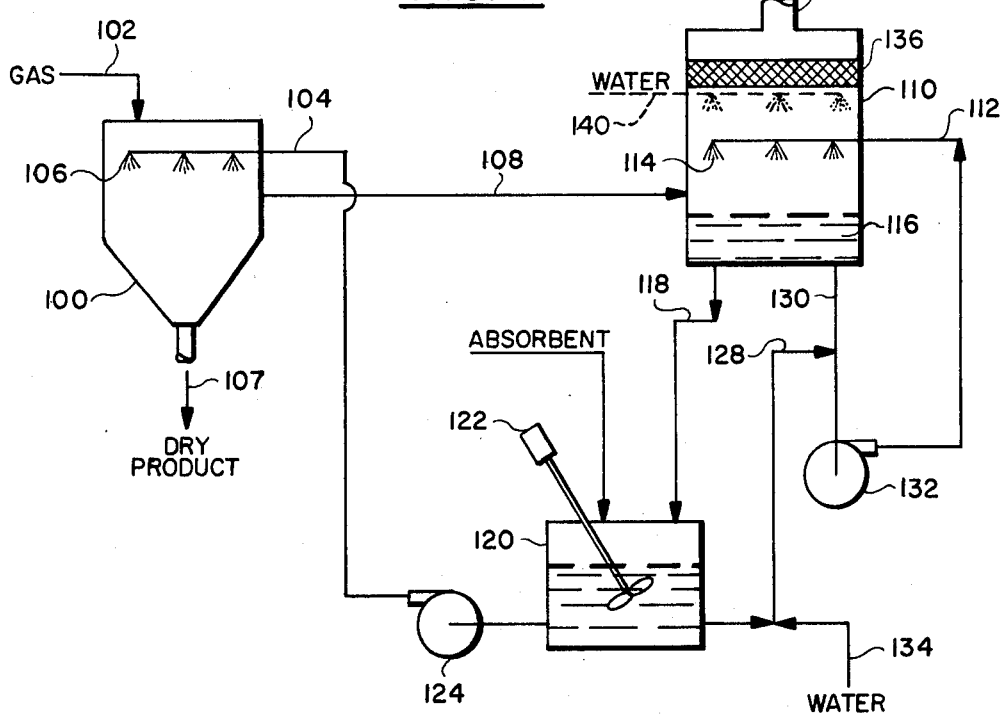
FIG. 2 is a schematic flow diagram illustrating another embodiment of the process of the present invention.

Referring now to FIG. 2 thereon is depicted a schematic flow diagram illustrating another embodiment of the process of the present invention which is particularly advantageous when it is desired to provide an aqueous scrubbing medium to the first zone having a higher concentration of absorbent than that being circulated through the second zone.

A hot gas containing sulfur oxide is introduced into a first scrubber 100 through line 102. The aqueous scrubbing medium containing an absorbent for the $SO_2$ is introduced via line 104 through a plurality of spray nozzles 106 forming a finely dispersed spray of aqueous scrubbing medium which contacts the hot gas to form (a) a dry reaction product removed through conduit 107 and consisting essentially of sulfites and sulfates substantially free of unreacted absorbent, and (b) a hot gas of reduced $SO_2$ content. The gas leaves scrubber 100 through conduit 108 for introduction into the second scrubber 110.

The gas entering scrubber 110 is contacted with another finely dispersed spray of aqueous scrubbing medium introduced into the scrubber via line 112 and a plurality of spray nozzles 114. The volume of aqueous scrubbing medium introduced into scrubber 110 is substantially in excess of that which can be vaporized by the remaining sensible heat of the hot gas whereby there is formed in scrubber 110 an aqueous solution 116 comprising sulfites, sulfates, partially reacted absorbent and unreacted absorbent. A portion of the aqueous solution 116 is withdrawn via line 118 and transferred to an aqueous scrubbing medium mixing tank 120 which is provided with a paddle stirrer 122. A stream of the scrubbing medium contained in mixing tank 120 is withdrawn and passed to scrubber 110 via pump 124 and line 104. Additional makeup absorbent is added to mixing tank 120 in an amount approximately equal to or even slightly less than the theoretical stoichiometric amount required to react with all the $SO_2$ contained in the hot gas entering scrubber 100.

Another stream of aqueous scrubbing medium is withdrawn from mixing tank 120 via line 128 for recycle through scrubber 110. A major portion of the aqueous solution 116 formed in scrubber 110 is withdrawn via line 130. The streams of aqueous scrubbing medium contained in lines 130 and 128 are combined and returned to scrubber 110 via pump 132 and line 112. Makeup water may be added to the system for example, via line 134 to further dilute the concentration of absorbent in the aqueous scrubbing medium being circulated through scrubber 110. Alternatively, all or a portion of the makeup water may be added directly to scrubber 110 via a separate line and spray system 140. The scrubbed processed gas, now substantially free of sulfur oxides, leaves scrubber 110 through a demister means 136 and outlet 138.

It will be appreciated that in accordance with the present invention, the process need not be restricted to the specific arrangement of apparatus disclosed herein or to the specific apparatus disclosed. There are numerous other types of equipment known to those skilled in the art which are equally suitable for contacting a gaseous stream with a finely dispersed spray of an aqueous solution, any of which would be suitable for use in the process of the present invention. The following examples are set forth to further illustrate the practice of the present invention. They are not intended to limit its generally broad scope, as numerous equivalents and variations will be apparent.

EXAMPLE 1

The following example will demonstrate the embodiment of the invention depicted schematically in FIG. 1. A flue gas obtained from the burning of a sulfur-containing coal and at a temperature of 305° F. is obtained and introduced into scrubber 10. The flue gas is introduced at a rate of 1200 standard cubic feet per minute and contains 400 parts per million sulfur oxides (0.00127 moles $SO_2$ per minute). An aqueous scrubbing medium also is introduced into scrubber 10 at a rate of about 3.82 pounds per minute. The aqueous scrubbing medium contains as the absorbent approximately 2.8% sodium carbonate to provide in scrubber 10 a mole ratio of sodium carbonate to SO₂ of about 0.8. The hot gas and aqueous scrubbing medium are contacted in the scrubber forming (1) a dry powder product at a rate of 0.153 pounds per minute comprising 89 wt.% sodium sulfite, 10 wt.% sodium sulfate, and less than about 1.0% sodium carbonate, and (2) a gaseous reaction product containing 80 p.p.m. sulfur oxide. The gaseous reaction product also contains about 0.05 grains per standard cubic foot of particulate material which consists essentially of reacted and partially reacted absorbent.

The gas leaves scrubber 10 at a temperature of about 160° F. and a relatively humidity of about 35%, and is transferred into a second scrubber 30. The hot gas passes through venturi nozzle 32 where it is contacted with an aqueous scrubbing medium which is introduced at a rate of 35 pounds per minute and which has substantially the same composition as the scrubbing medium introduced into the first scrubber. The rate of introduction of the aqueous scrubbing medium into the second scrubber is such as to provide a mole ratio of fresh absorbent feed to entering sulfur oxide of about 4.25:1.

The aqueous solution formed in scrubber 30 is withdrawn at a rate of 33.7 pounds per minute and contains 0.009 wt.% sodium sulfate, 0.08 wt.% sodium sulfite, and 2.8 wt.% unreacted sodium carbonate. A major portion of the solution withdrawn (approx. 90 wt.%) is recycled through scrubber 30. The balance of the solution withdrawn is utilized as the aqueous scrubbing medium introduced into scrubber 10. Makeup absorbent and water are added to the solution withdrawn from scrubber 30 in an amount of 0.128 pounds per minute sodium carbonate and 4.4 pounds per minute water.

A sample of the gas leaving scrubber 30 is obtained and analyzed. The gas is found to be at a temperature of 132° F., have a relative humidity of almost 100%, a particulate content of about 0.005 grains/SCF, and a sulfur oxide content of less than 15 parts per million.

This example demonstrates that in accordance with the present invention (1) in excess of 96% of the sulfur oxides are removed from the gas, (2) a substantially particulate free effluent gas is obtained, (3) absorbent utilization is in excess of about 99%, (4) the solid product (spent absorbent) is obtained as a dry powder product, and (5) the total process absorbent requirements are only about 0.95 mole of sodium carbonate per mole of sulfur oxide contained in the untreated gas.

EXAMPLE 2

The following example demonstrates the process of the present invention depicted schematically in FIG. 2. A flue gas obtained from the burning of carbonaceous fuel is obtained and introduced into scrubber 100. The flue gas is at a temperature 305° F., and contains 400 p.p.m. SO₂. It is introduced at a rate of 1200 standard cubic feet per minute.

Also introduced into scrubber 100 at a rate of 3.82 pounds per minute is an aqueous solution of a scrubbing medium containing 2.8 wt.% sodium carbonate and less than about 1% sodium sulfite and sodium sulfate. The aqueous scrubbing medium is introduced through a plurality of spray nozzles where it contacts the flue gas to form a dry powder reaction product which is removed from the scrubber. The dry powder product is removed at a rate of 0.153 pounds per minute and upon analysis is found to contain 89% sodium sulfite, 10% sodium sulfate, and less than 1% unreacted absorbent, i.e., sodium carbonate.

The effluent gas from scrubber 100 is at a temperature of 162° F., a relative humidity of 35% and contains approximately 80 parts per million sulfur oxides. The effluent gas contains approximately 0.05 grains per standard cubic feet of particulate material which is principally sodium sulfate and sodium sulfite. The effluent gas is introduced into a second scrubber 110 where it is contacted with an aqueous scrubbing medium. The aqueous scrubbing medium is introduced at a rate of 50.3 pounds per minute and contains approximately 0.30 wt.% sodium carbonate and 0.73 wt.% sodium sulfate and sodium sulfite. The aqueous scrubbing medium is introduced through a plurality (about 50) spray nozzles to provide intimate contact with the gas and forms (1) an effluent gas product which leaves at a temperature of about 132° F., contains less than about 15 parts per million sulfur oxides and contains less than 0.005 grains of particulate material per standard cubic foot, and (2) an aqueous solution containing about 0.20 wt.% sodium carbonate and 0.80 wt.% sodium sulfite and sulfate.

A minor portion of the aqueous solution is removed from scrubber 110 and transferred to a mixing tank where makeup absorbent is added at a rate of 0.128 pounds per minute to provide about 1.0 mole sodium carbonate per mole of SO₂ contained in the untreated flue gas entering scrubber 100. The aqueous scrubbing medium supplied to first scrubber 100 is obtained from mixing tank 120 and introduced into scrubber 100 in an amount sufficient to provide about 0.8 mole sodium carbonate per mole of sulfur oxide contained in the flue gas entering the scrubber. Another stream of aqueous scrubbing medium is withdrawn from the mixing tank and added to a major portion of the aqueous solution which is withdrawn from scrubber 110 and recycled through the spray nozzles for contact with additional gas.

With this particular embodiment it is possible to provide to the first scrubber an aqueous solution having a higher concentration of absorbent than that circulating through the second scrubber. Further, as demonstrated by this example, an overall sulfur oxide removal in excess of 96% is obtained. Further, sodium carbonate utilization is in excess of 99%. Still further, substantially all of the solid reactant product is obtained as a dry flowable powder which is readily removable and either discarded as waste or processed in a regeneration system to recover the sulfur constituents and regenerate the absorbent.

It will of course be realized that many variations in reaction conditions may be used in the practice of this invention, within the limits of the critical parameters set forth, depending upon the particular sulfur oxide content and temperature of the flue gas to be desulfurized, as well as the hydrocarbon or fossil fuel serving as the source of combustion gas. Thus, while the examples illustrating this invention have been described with respect to specific concentrations, times, temperatures, and other reaction conditions, and what is now considered to represent its best embodiment has been illustrated and described, the invention may be otherwise practiced within the scope of the teaching set forth, as will be readily apparent to those skilled in this art. Accordingly, this invention is not to be limited by the illustrative and specific embodiments thereof, but its scope should be determined in accordance with the following claims.

What is claimed is:

1. A continuous process for removing sulfur oxides from hot gases containing the same comprising the steps of:
    (a) introducing the hot gas containing sulfur oxides into a first zone;
    (b) introducing a finely dispersed aqueous scrubbing medium containing an absorbent selected from the group consisting of alkali metal carbonates, alkali metal bicarbonates and mixtures thereof into the first zone, said aqueous scrubbing medium being introduced in an amount to provide an equivalent weight ratio of absorbent to sulfur oxide of about 0.8:1;
    (c) contacting the hot gas with said aqueous scrubbing medium and forming (1) a substantially water-unsaturated gaseous reaction product of reduced sulfur oxide content and (2) a dry powder reaction product containing alkali metal sulfites and sulfates, substantially free of unreacted absorbent;
    (d) transferring the gaseous reaction products from the first zone into a second zone;
    (e) contacting the gas in the second zone with an aqueous scrubbing medium containing an absorbent selected from the group consisting of alkali metal carbonates, alkali metal bicarbonates and mixtures thereof and forming an aqueous solution of alkali metal sulfates, sulfites and unreacted absorbent, and a gaseous reaction product substantially free of sulfur oxides, said absorbent being provided in an equivalent weight ratio of absorbent to sulfur oxide contained in the gas introduced into the second zone of at least 1.5:1; and
    (f) recovering a portion of the aqueous solution formed in the second zone and using it as at least a part of the aqueous scrubbing medium introduced into the first zone.

2. The process of claim 1 wherein another portion of the aqueous solution formed in the second zone in step (e) is recycled through the second zone.

3. The process of claim 2 wherein the selected absorbent is sodium carbonate.

4. The process of claim 1 wherein the selected absorbent is sodium carbonate.

5. The process of claim 4 wherein another portion of the aqueous solution formed in the second zone in step (f) is recycled through the second zone.

6. The process of claim 5 wherein another portion of the aqueous solution formed in the second zone in step (f) is recycled through the second zone.

7. The process of claim 6 wherein the selected absorbent is sodium carbonate.

8. A continuous process for removing sulfur oxides from hot gases containing the same comprising
    (a) providing first and second zones,
    (b) providing a source of an aqueous scrubbing medium containing an absorbent selected from the group consisting of alkali metal carbonates, alkali metal bicarbonates and mixtures thereof,
    (c) passing the hot gas containing sulfur oxides sequentially through said first and second zones,
    (d) withdrawing a stream of the aqueous scrubbing medium containing the selected absorbent from said source provided in step (b) and introducing the stream in a finely dispersed spray into the first zone in an amount to provide an equivalent weight ratio of absorbent to sulfur oxide contained in the hot gas passing therethrough of about 0.8:1,
    (e) contacting the hot gas with said finely dispersed spray and forming
        (1) a substantially water-unsaturated gaseous reaction product of reduced sulfur oxide content and
        (2) a dry powder reaction product containing alkali metal sulfates and sulfides substantially free of unreacted absorbent,
    (f) withdrawing another stream of the aqueous scrubbing medium containing the selected absorbent from said source provided in step (b) and introducing it into said second zone into intimate contact with the hot gas passing therethrough in an amount to provide an equivalent weight ratio of absorbent to sulfur oxide of at least 1.5:1 to form
        (1) an aqueous solution of alkali metal sulfates, sulfides, and unreacted absorbent, and
        (2) a gaseous reaction product substantially free of sulfur oxides,
    (g) returning at least a portion of the aqueous solution formed in (f) to said source of aqueous scrubbing medium,
    (h) discharging the gaseous reaction products substantially free of sulfur oxides from said second zone,
    (i) adding additional absorbent to said source (b) in about the stoichiometric amount required to react with all the sulfur oxides initially contained in the hot gas being processed, and
    (j) adding makeup water in an amount about equal to that required to cool the hot gas entering the process to its temperature of adiabatic saturation.

9. A continuous process for removing sulfur oxides from hot gases containing the same, comprising the steps of:
    (a) introducing the hot gas containing sulfur oxides into a first zone;
    (b) introducing into the first zone a finely dispersed aqueous scrubbing medium containing an absorbent from a source to be provided in step (g);
    (c) contacting the hot gas with said aqueous scrubbing medium and forming (1) a substantially water-unsaturated gaseous reaction product of reduced sulfur oxide content and (2) a dry powder reaction product containing alkali metal sulfites and sulfates, and substantially free of unreacted absorbent;
    (d) transferring the gaseous reaction products from the first zone into a second zone;
    (e) introducing into the second zone an aqueous scrubbing medium containing an absorbent selected from the group consisting of alkali metal carbonates, alkali metal bicarbonates and mixtures thereof, said absorbent being provided in an amount to provide an equivalent weight ratio of absorbent to sulfur oxide contained in the gaseous reaction product transferred from the first zone of at least 1.5:1;
    (f) contacting the gas in the second zone with said aqueous scrubbing medium and forming (1) an aqueous solution of alkali metal sulfates, sulfites and unreacted and partially reacted absorbent, and (2) a gaseous reaction product substantially free of sulfur oxides; and
    (g) utilizing a portion of said aqueous solution formed in the second zone as said source of aqueous scrubbing medium introduced into the first zone, said aqueous solution being introduced into the first zone in an amount to provide an equivalent weight ratio of absorbent to sulfur oxide contained in the gas introduced therein of about 0.8:1.

10. The process of claim 8 wherein in step (b) the selected absorbent is sodium carbonate.

* * * * *

UNITED STATES PATENT AND TRADEMARK OFFICE
CERTIFICATE OF CORRECTION

PATENT NO. : 4,198,380
DATED : April 15, 1980
INVENTOR(S) : Arthur L. Kohl

It is certified that error appears in the above-identified patent and that said Letters Patent are hereby corrected as shown below:

Column 1, line 30, "many" should read --may--.

Column 6, line 17, "gate" should read --gas--.

Column 10, line 20, "110" should read --100--.

Column 11, line 12, "relatively" should read --relative--.

Column 13, Claim 5, line 1, "4" should read --8--;
          Claim 6, line 1, "5" should read --9--.

Signed and Sealed this

Twenty-ninth Day of July 1980

[SEAL]

Attest:

SIDNEY A. DIAMOND

Attesting Officer     Commissioner of Patents and Trademarks